US011673142B2

(12) United States Patent
Malin

(10) Patent No.: US 11,673,142 B2
(45) Date of Patent: Jun. 13, 2023

(54) DEVICE FOR THE LOW-TEMPERATURE STORAGE AND THE HANDLING OF PROBE TUBES IN TUBE RACKS

(71) Applicant: LICONIC AG, Mauren (LI)

(72) Inventor: Cosmas G. Malin, Mauren (LI)

(73) Assignee: LICONIC AG, Mauren (LI)

( * ) Notice: Subject to any disclaimer, the term of this patent is extended or adjusted under 35 U.S.C. 154(b) by 633 days.

(21) Appl. No.: 15/762,809

(22) PCT Filed: Sep. 23, 2016

(86) PCT No.: PCT/CH2016/000124

§ 371 (c)(1),
(2) Date: Mar. 23, 2018

(87) PCT Pub. No.: WO2017/049416

PCT Pub. Date: Mar. 30, 2017

(65) Prior Publication Data

US 2018/0272353 A1 Sep. 27, 2018

(30) Foreign Application Priority Data

Sep. 24, 2015 (CH) ...................................... 1390/15

(51) Int. Cl.
*B01L 7/00* (2006.01)
*F25D 25/00* (2006.01)
(Continued)

(52) U.S. Cl.
CPC .................................... *B01L 7/50* (2013.01); *F25D 3/11* (2013.01); *F25D 3/127* (2013.01); *F25D 25/00* (2013.01);
(Continued)

(58) Field of Classification Search
None
See application file for complete search history.

(56) References Cited

U.S. PATENT DOCUMENTS

2003/0233842 A1 12/2003 Junca et al.
2009/0175763 A1 * 7/2009 Malin ................ G01N 35/0099 422/65

(Continued)

FOREIGN PATENT DOCUMENTS

EP 2078961 A2 * 7/2009 ......... G01N 35/0099
JP 2015-099096 5/2015
WO WO-2014197511 A2 * 12/2014 ................ B01L 7/04

*Primary Examiner* — P. Kathryn Wright
(74) *Attorney, Agent, or Firm* — Greenblum & Bernstein, P.L.C.

(57) ABSTRACT

A device for the handling and the low-temperature storage of probe tubes in tube racks includes a low-temperature compartment having insulated side and bottom walls and at least one opening at a top side. The compartment is used for storing at least one tube rack at a low temperature. The device has a holder apparatus comprising a rack holder for holding a tube rack and a picker apparatus comprising a gripper adapted to remove and insert individual tubes from or into a tube rack held by the holder. The holder apparatus is adapted to displace the rack holder between an upper rack position outside low-temperature compartment above the opening and a lower rack position inside the compartment. The picker apparatus is adapted to displace the gripper between an upper gripper position outside the compartment above the opening and a lower gripper position inside the compartment below the opening.

22 Claims, 3 Drawing Sheets

(51) Int. Cl.

| | |
|---|---|
| ***F25D 25/02*** | (2006.01) |
| ***F25D 3/12*** | (2006.01) |
| ***F25D 3/11*** | (2006.01) |
| ***F25D 25/04*** | (2006.01) |
| *B01L 9/06* | (2006.01) |
| *G01N 35/00* | (2006.01) |

(52) U.S. Cl.
CPC ........... *F25D 25/021* (2013.01); *F25D 25/04* (2013.01); *B01L 9/06* (2013.01); *F25D 2400/10* (2013.01); *G01N 2035/00435* (2013.01)

(56) References Cited

U.S. PATENT DOCUMENTS

2012/0060514 A1 3/2012 Warhurst et al.
2012/0060520 A1* 3/2012 Collins ................ A01N 1/0236 62/62
2012/0134897 A1 5/2012 Malin
2012/0134898 A1* 5/2012 Malin ....................... F25D 3/10 422/559
2013/0011226 A1* 1/2013 Camenisch .......... B65G 1/0464 414/277
2013/0151004 A1 6/2013 Winter et al.
2016/0114326 A1* 4/2016 Schryver ................. F25D 3/125 62/465
2016/0288999 A1* 10/2016 Caveney ................... F25D 3/11

* cited by examiner

DEVICE FOR THE LOW-TEMPERATURE STORAGE AND THE HANDLING OF PROBE TUBES IN TUBE RACKS

TECHNICAL FIELD

The invention relates to a device for the low-temperature storage and the handling of probe tubes in tube racks. The invention also relates to a method for operating such a device.

BACKGROUND ART

Devices of this type are used to automatically handle and store probe tubes at low temperatures, e.g. at −80° C. or lower. They are often of complex design, e.g. comprising a low-temperature compartment, an automated door and robotics to access the probes through the door.

DISCLOSURE OF THE INVENTION

The problem to be solved by the present invention is therefore to provide a simple design for such a device.

This problem is solved by the device of claim 1.

Accordingly, the device for the low-temperature storage and the handling of probe tubes in tube racks comprises:

- A low-temperature compartment: This compartment has insulated side and bottom walls and at least one opening at its top side,
- A holder apparatus: The holder apparatus comprises a rack holder for holding a tube rack.
- A picker apparatus: The picker apparatus comprises gripper adapted to remove and insert individual tubes from a tube rack or into a tube rack held by said rack holder.

The holder apparatus further comprises a holder elevator for displacing the rack holder between an upper rack position outside the compartment above said opening and a lower rack position inside the compartment below said opening.

This design allows to remove and insert individual tube racks from above through the upper opening of the low-temperature compartment. The tube racks can be accessed quickly, while keeping temperature variations in the low-temperature compartment at a minimum.

Advantageously, the picker apparatus comprises a picker elevator for displacing the gripper between an upper gripper position outside the compartment and above said opening, and a lower gripper position inside the compartment and below said opening. In other words, the gripper can be automatically displaced between a position above the low-temperature compartment and a position in the low-temperature compartment. This allows to access the tubes in a tube rack located in the low-temperature compartment. On the other hand, the gripper can be removed from the low-temperature compartment and be maintained at moderate temperatures when not used, or it can be used for moving a probe tube between the low-temperature compartment and a location outside the low-temperature compartment.

The lower gripper position and the lower rack position are advantageously selected such that the gripper in the lower gripper position is located, at least in vertical direction; to access a tube in a tube rack held by the rack holder in the lower rack position.

In a further advantageous embodiment, the holder apparatus is displaceable in a first horizontal direction, and the picker apparatus is displaceable in a second horizontal direction. Thus, the gripper can access any location in a tube rack held by the rack holder. Advantageously, the first horizontal direction is perpendicular to the second horizontal direction.

Furthermore, the device can comprise a first and a second holder apparatus, i.e. it has at least two holder apparatuses of the type mentioned above.

In that case, and in particular if the rack holders of the two holder apparatuses are movable independently, a first one of the rack holders can e.g. be used to keep a tube rack at low temperature for permanent storage, while the other rack holder can move a “shuttle” tube rack up and down for transferring one or more tubes from or to the tube rack held by the first holder apparatus.

The two holder apparatuses are advantageously mounted to a common holder frame, which holder frame is displaceable in a horizontal direction. Hence, the two holder apparatuses can be commonly displaced. The direction of displacement is advantageously the “first horizontal direction” as mentioned above.

The holder apparatus can comprise a rack retainer located above the rack holder and lowerable towards the rack holder for engaging a tube rack between the rack holder and the rack retainer. This allows to retain the rack holder while a tube is being removed therefrom or while the tube rack is being moved.

The device can further comprise a rack handler adapted to transfer a tube rack between said upper rack position and at least one further position outside the low-temperature compartment. In the course of such a transfer, the rack handler can remove the tube rack from the rack holder or insert the tube rack into the rack holder.

The present invention also relates to a method for operating the present device. In this method, the environment above the top opening of the low-temperature compartment is maintained at a temperature below 0° C. but above the temperature in the low-temperature compartment and at a relative humidity of less than 20%.

This operation reduces thermal stress on the probes and reduces ice formation in the low-temperature compartment.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING PUT THE INVENTION

Definitions:

The term “low-temperature” or “low temperature” as used herein designates temperatures below 0° C., in particular below −20° C., in particular below −60° C., e.g. at −80° C. or at −200° C.

A “tube rack” is a container for receiving a plurality of probe tubes. Such tube racks are known to the skilled person. They are typically of rectangular shape and contain a plurality of seats in a regular two-dimensional array for receiving the probe tubes. The probes are held loosely in their seats in the sense that they can be pulled upwards and oat of the tube rack, while the tube rack holds them laterally and supports them from below. Typically, the bottom of the tube is accessible from below the tube rack.

Figure 1:
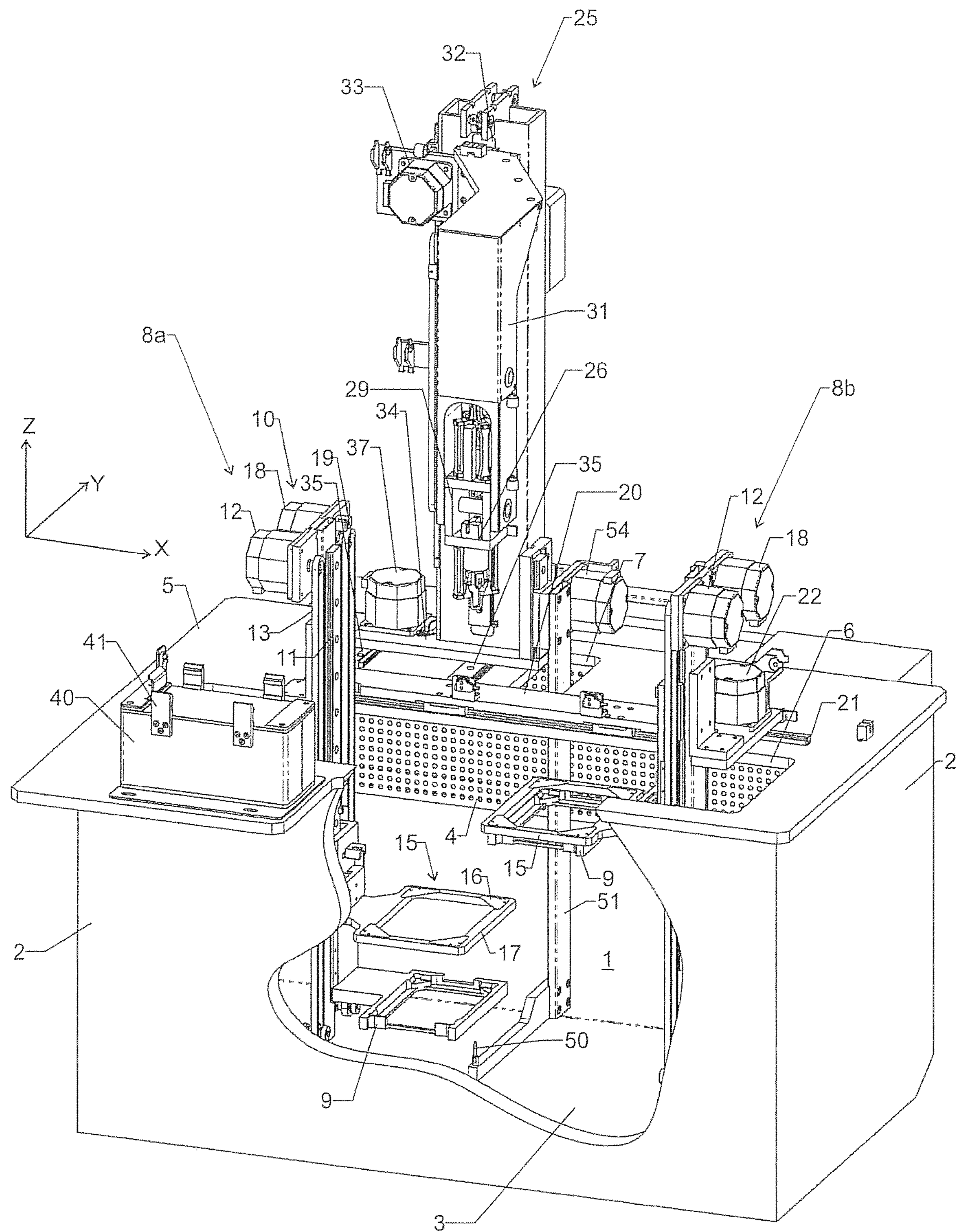
FIG. 1 shows a device for the handling and the low-temperature storage probe tubes in tube racks.

Device:

FIG. 1 shows a device adapted for storing probe tubes in tube racks at low temperature. The device is also adapted to manipulate the tube racks as well as the tubes therein.

The device comprises a low-temperature compartment 1 in its lower section. Compartment 1 is enclosed by insulated sidewalls 2 as well as an insulated bottom wall 3. The sidewalls 2 as well as the bottom wall 3 are e.g. insulated by vacuum insulation panels in order to stably maintain the temperature within compartment 1.

Compartment 1 is advantageously cooled passively. For passive cooling (i.e. for a cooling without heat pump) one or more refrigerant containers 4 are arranged on at least one of the sidewalls 2 of low-temperature compartment 1, or elsewhere within the compartment. The refrigerant container(s) 4 has at least one perforated sidewall that communicates with the interior of compartment 1. The refrigerant container(s) 4 can e.g. receive frozen carbon dioxide, which sublimates and keeps compartment 1 cold. Alternatively, liquid nitrogen can be used, or the device can be equipped with a heat pump as described below.

A cover plate 5 is arranged at the top of compartment 1. Cover plate 5 comprises openings 6 and 7 providing access to compartment 1 from above.

It must be noted, that the opening or openings 6 and 7 can remain open permanently without substantially affecting the temperature stability within compartment 1. Since the air within compartment 1 is colder than the environment, the gas exchange and temperature flow through the openings will be low. To further improve temperature stability within compartment 1, the depth of compartment 1, i.e. its extension below cover plate 5, is advantageously at least 50 cm.

Various equipment for handling tubes and tube racks is arranged on cover plate 5.

The embodiment shown here comprises a first holder apparatus 8*a* and a second holder apparatus 8*b* of substantially symmetrical design.

Each holder apparatus 8 is adapted to hold and handle a tube rack. It comprises a rack holder 9 forming a cradle for receiving the tube rack. Rack holder 9 supports the tube rack from below and from its sides.

Rack holder 9 is mounted to a holder elevator 10 adapted to move rack holder 9 in vertical direction Z.

In the shown embodiment, holder elevator 10 comprises a holder rail 11 that extends vertically through opening 6 from a top end outside compartment 1 to a bottom end within compartment 1. Holder elevator 10 further comprises a first elevator drive 12 driving a belt 13 connected to rack holder 9 in order to move rack holder 9 along holder rail 11. In this manner, each rack holder 9 can be displaced from a lower rack position close to the bottom of compartment 1 below opening 6 to an upper rack position outside the compartment 1 above opening 6.

Holder apparatus 8 further comprises a rack retainer 15 located above rack holder 9. The purpose of rack retainer 15 is to retain the tube rack in rack holder 9 while the tubes therein, are manipulated. For this purpose, it can be lowered from above towards rack holder 9 for engaging the tube rack between rack holder 9 and rack retainer 15.

In the embodiment shown, rack retainer 15 comprises four retaining members 16 arranged in a rectangular frame 17. The retaining members 16 are positioned to abut from above onto the corners of a tube rack that is held in the rack holder 9.

It must be noted that the number of retaining members 16 can vary. For example, there may be only two retaining members 16 located to abut on opposite corners or edges of the tube rack.

Rack retainer 15 is also mounted to holder rail 11 and vertically displaceable along it. Holder apparatus 8 comprises a second elevator drive 18 driving a belt 19, which is in turn connected to rack retainer 15 for displacing the same along holder rail 11.

Figure 3:
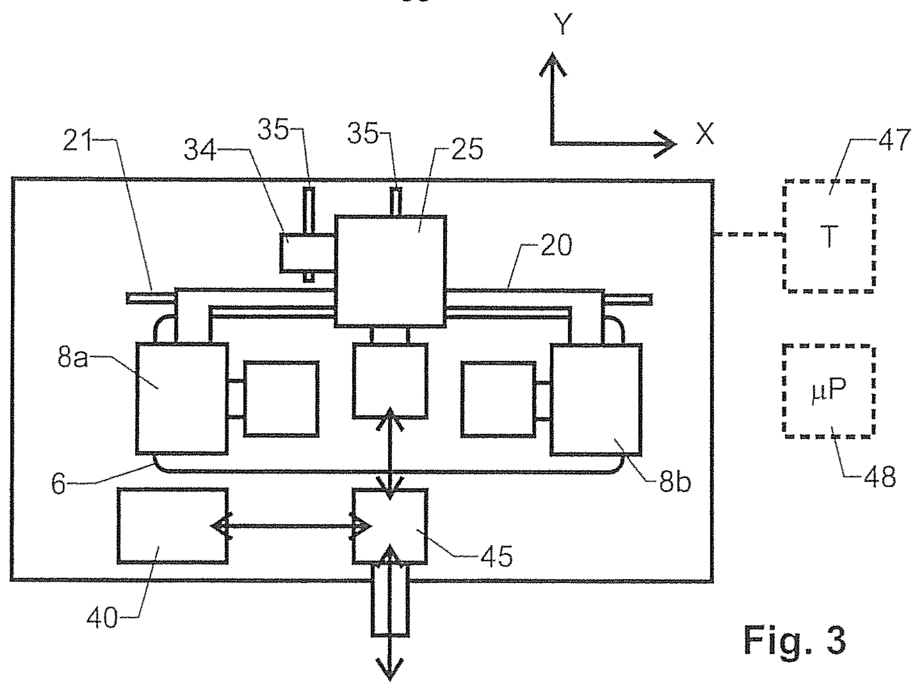
FIG. 3 shows a schematic top view of such a device with some further components.

As can best be seen from FIG. 1 as well as from the schematic representation of FIG. 3, both holder apparatuses 8*a*, 8*b* are mounted to a common holder frame 20. Holder frame 20 is displaceable along a first horizontal direction X along a holder frame rail 21 located outside low-temperature compartment 1. In the embodiment shown in FIG. 1, holder frame rail 21 is mounted to cover plate 5 and extends along an edge of opening 6. A holder frame drive 22 is provided for moving holder frame 20 along holder frame rail 21.

Hence, the holder apparatuses 8*a*, 8*b* can be commonly displaced along first horizontal direction X. However, their two rack holders 9 (as well as the rack retainers 15) can be moved independently.

The present device further comprises a picker apparatus 25. The purpose of picker apparatus 25 is to handle individual probe tubes, e.g. for transferring them between tube racks.

Picker apparatus 25 comprises a gripper 26 adapted to remove and insert individual tubes from or into a tube rack held in one of the rack holders 9.

Figure 2:
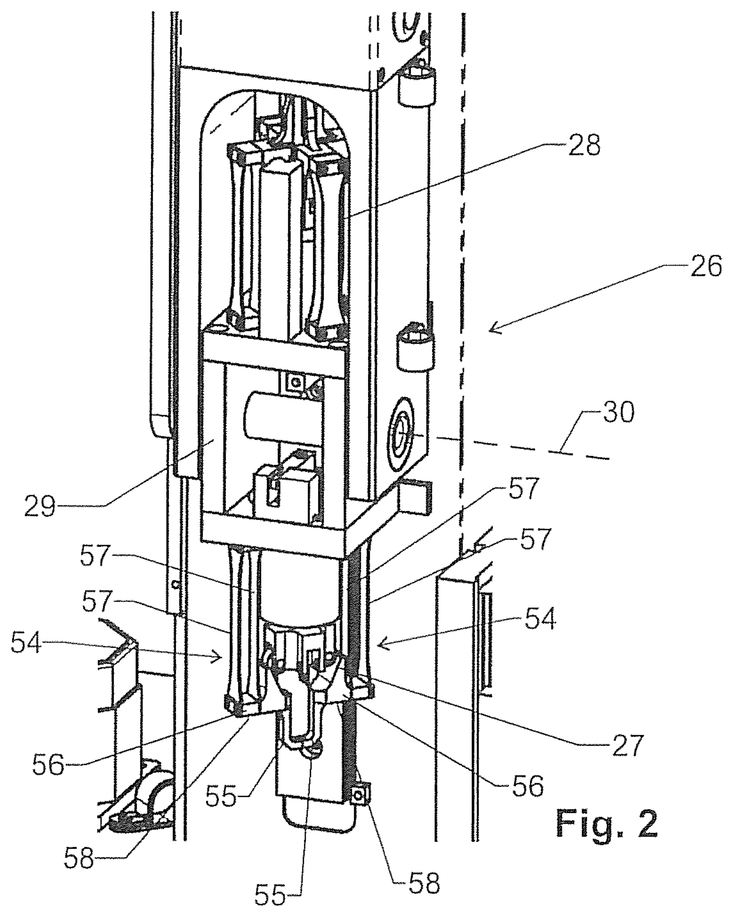
FIG. 2 shows the gripper of the device of FIG. 1 in enlarged view.

Gripper 26 is shown in detail in FIG. 2. In the shown embodiment, it comprises two gripper hands 27, 28, which differ in their design. For example, one of the gripper hands can be adapted to engage smaller tubes, while the other may be adapted to engage larger tubes. Or, as shown in FIG. 2, one gripper hand may comprise two fingers while the other one may comprise four fingers for gripping tubes of different geometries.

The two gripper hands are mounted to a common carrier 29, which is rotatable about a horizontal axis 30 in order to bring one gripper hand into an active position and the other one into an idle position. In the embodiment of FIG. 2, the active position is the bottom position the idle position is the top position.

As seen in FIG. 2, each gripper hand comprises two or more movable fingers 54, which can be operated to laterally engage a probe tube. In the shown embodiment, each finger has a tip 55 mounted to a tip carrier 56, which in turn is elastically held by means of two parallel leaf springs 57. Each tip carrier 56 forms a shoulder 58. The diameter of the gripper is smaller at the height of the tips 55 below the shoulders 58 than immediately above the shoulders 58. In other words, the gripper has a narrow tip section formed by the tips 55 that is suitable to inserted between the gaps of neighbouring probe tubes in a tube rack, a shoulder section formed by the shoulders 58 immediately above the tip section that is wider than the tip section. Hence, the shoulders can be used to push from the top onto the tubes adjacent to a tube to be picked up, in order to push them down into the tube rack while engaging a single tube. This is described in more detail below.

Gripper 26 is, as shown in FIG. 1, mounted to the bottom end of an arm 31. The upper end of arm 31 is mounted to a picker rail 32. Picker rail 32 extends vertically and has a height of approximately the height of compartment 1. It is located, fully outside of compartment 1 and can therefore be maintained at moderate temperatures, which prevents ice formation. This is advantageous because gripper 26 has to be lowered and raised often and quickly.

The combined height of arm 31 and gripper 26 is sufficient to reach a tube rack even if the same is located at the bottom of compartment 1.

A picker drive 33 and the picker rail 32 together form a picker elevator for displacing gripper 26 and arm 31 along picker rail 32 between an upper gripper position, where (as shown in FIG. 1) gripper 26 is located outside compartment 1 above opening 6, and a lower gripper position, where gripper 26 is located inside compartment 1 below opening 6.

Picker apparatus 25 is displaceable along a second horizontal direction Y, which is perpendicular to first horizontal direction X, or at least at an angle thereto. For this purpose, holder apparatus 25 is mounted to a base 34 running on rails 35 as shown in FIGS. 1 and 3. A drive 37 is provided to displace picker apparatus 25 along the rails 35.

As shown in FIG. 1, the device further comprises a scanning station 40. Scanning station 40 has a seat 41 for receiving an individual tube rack. A camera located in scanning station 40 is provided for reading markings on the probe tubes or the tube rack from below.

As schematically shown in FIG. 3, the device further comprises a rack handler 45, which can, e.g., be a robotic arm with a tube rack gripper adapted to handle whole tube racks. Rack handler 45 can e.g. be translatable along the horizontal directions X and Y and/or pivotal about vertical direction Z. It is used to transport the tube racks between a rack holder 9 in its upper rack position and at least one further position outside the compartment 1, thereby removing the tube rack from the rack holder or inserting it into the rack holder. This “further position” can, for example, be scanning station 40 or a location outside the device.

As also shown in FIG. 3, the device can comprise a temperature controller 47, which is adapted to monitor and/or control the temperature within compartment 1. Further, a control unit 48 is provided tor controlling the movements of the various parts of the device, and in particular the operation of the device as e.g. described in the following section.

Operation:

In operation, the holder apparatuses 8*a*, 8*b* are used to handle tube racks. In particular, each holder can receive a tube rack by bringing its rack holder 9 into its upper rack position outside compartment 1. For example, in order to receive a tube rack from rack handler 45, one of the rack holders 9 is brought into its upper rack position and the respective holder apparatus 8 is moved along horizontal direction X in order to position rack holder 9 in front of rack handier 45. Rack retainer 15 is raised to provide free access to rack holder 9. Now, rack handler 45 can insert a tube rack into rack holder 9.

After receiving a tube rack, rack retainer 15 is lowered to safely retain the tube rack in rack holder 9, and rack retainer 15 and rack holder 9 are together lowered to the lower rack position at the bottom of compartment 1.

The same steps, but in reverse order, are carried out for removing a tube rack from rack holder 9.

In order to access an individual probe within a tube rack, the rack holder 9 that holds the tube rack is displaced along direction X in order to bring the row of the tube rack holding the probe tube to a position below gripper 26. Gripper 26 is displaced along direction Y in order to bring it above the column of the tube rack holding the probe tube. Gripper 26 can then be lowered to engage the probe tube.

To assist retrieving a probe tube from a tube rack, in particular when ice has formed on the tubs rack and makes removal of a probe tube difficult, picker apparatus 25 comprises a pusher 50 located vertically below gripper 26. Pusher 50 is connected by means of a bar 51 to base 34 in order to keep its position along directions X and Y vertically below gripper 26 at any time. Bar 51 extends through second opening 7 of cover plate 5. A drive 54 is provided to move pusher 50 in vertical direction.

If ice has formed between the probe tubes on a tube rack, the operation of pusher 50 may cause several tubes to be pushed upwards, namely the tube to be picked up but also tubes neighbouring thereto. To push the neighbouring tubes back into the tube rack, the shoulders 58 of the gripper 26 can, as described above, be used.

In order to retrieve a probe tube from the tube rack, pusher 50 is moved upwards to abut against the bottom of the probe tube and to lift it from its seat in the tube rack, whereupon it can be engaged by gripper 26.

In this manner, gripper 26 can be used to individually handle probe tubes in the tube racks held in the rack holders 9. While probe tube handling takes place, the rack holders 9 can be located either within compartment 1 at their lower rack position, or they can be held above compartment 1 in their upper rack position.

In an advantageous embodiment, gripper 26 can be used to move probe tubes between the tube racks held in the rack holders 9 of the two holder apparatuses 8*a*, 8*b*. To do so, the holder apparatuses 8*a*, 8*b* are commonly displaced along direction X back and forth in order to bring first one and then the other rack holder 9 below gripper 26.

The device can in particular be adapted to keep a first tube rack permanently (i.e. for an extended duration) within compartment 1, held by first rack holder 8*a*, while a tube rack held in the second rack holder 8*b* is used as a “shuttle” between the outside and the inside compartment 1. In the first tube rack, probe tubes can be maintained at low temperature. If one or more of the tube racks are required to be retrieved, the shuttle tube rack can be lowered by means of second holder apparatus 8*b* into compartment 1, gripper 26 can be operated to quickly transfer the desired probe tube(s) to the shuttle tube rack, whereupon the shuttle tube rack can be raised to its upper rack position, from where the tube rack can e.g. be transferred by rack handier 45. Steps of opposite order can be used to move tubes to the first tube rack.

As mentioned, the present device is best used in a cooled, low-humidity environment, where the temperature of the space above opening 6 is below 0° C., but higher than the temperature in the compartment 1 itself. Further, the relative air humidity above opening 6 should be less than 20% in order to reduce ice formation in compartment 1.

For example, the present device can be operated in a climate-controlled chamber that maintains a refrigerated, dry atmosphere.

Figure 4:
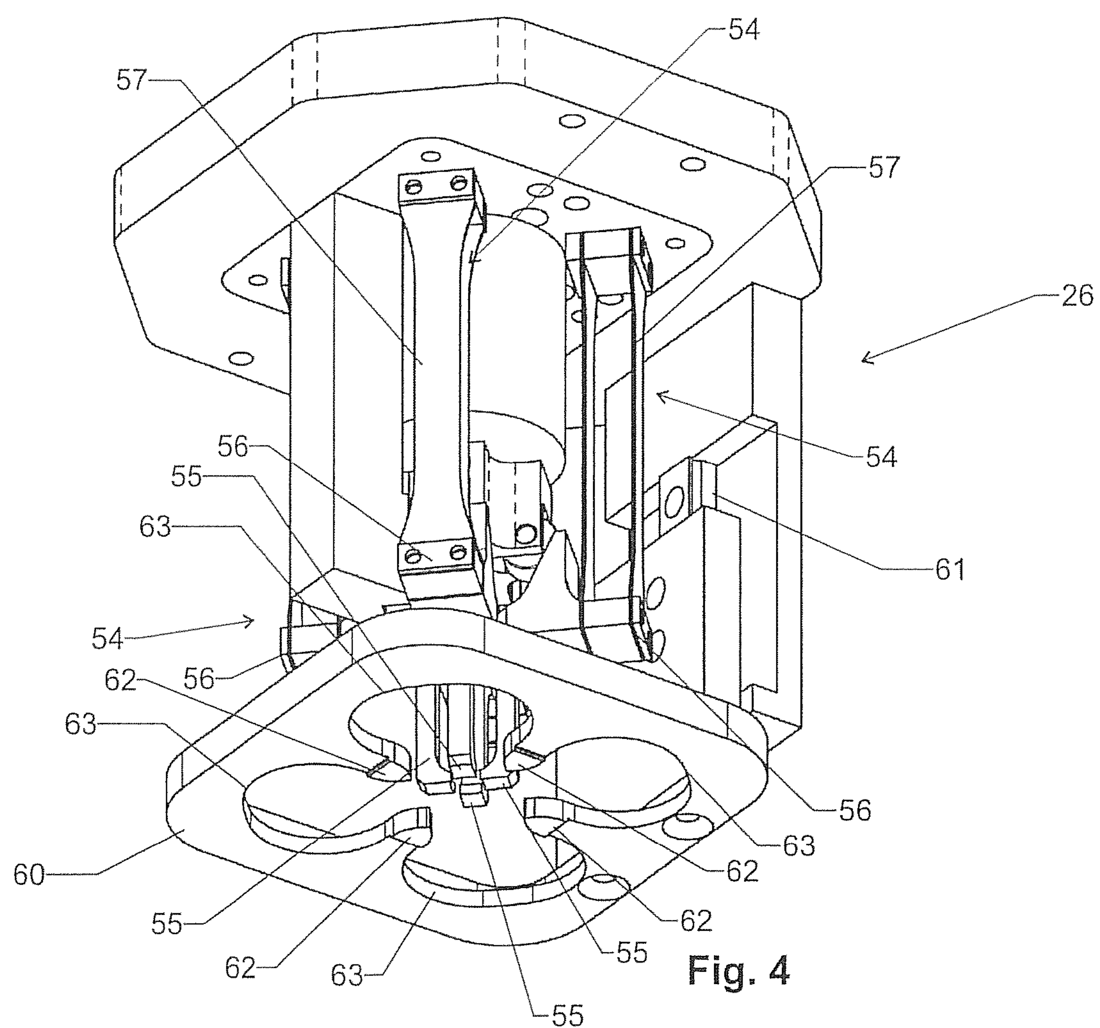
FIG. 4 shows an alternative embodiment of a gripper.

Alternative Gripper:

FIG. 4 shows an alternative gripper 26 for the present device. This gripper 26 again comprises fingers 54 with tips 55 movable to laterally engage the probe tube, as in the embodiment of FIG. 2. The tips 55 are again held by wider tip carries 56 connected to leaf 25 springs 57.

In addition, the gripper of FIG. 4 comprises a tube retainer 60 being vertically movable in respect to the fingers 54. For this purpose, tube retainer 60 is slideably mounted on a vertical tube retainer rail 61 and can be moved by a suitable drive.

Tube retainer 60 comprises retainer members 62 located at a horizontal distance around the tips 55 and positioned above tubes neighbouring to the tube to be picked up.

Further, tube retainer 60 advantageously forms recesses 63 between the retainer members 62. The recesses 63 form passages for the wider tip carriers 56.

At least the tip section of the gripper 26, and advantageously also the tip carriers 56, can be vertically moved through retainer member 60 to engage a probe tube below it, and, after engaging the tube, the tip section can be retracted to a position above retainer member 60 while holding on to the tube.

Tube retainer 60 can be used to push down tubes adjacent to a tube to be picked up, similar to the shoulders of the embodiment of FIG. 58. However, since tube retainer 60 is vertically movable in respect to the gripper, and because at least the tip section can extend through tube retainer 60, tube retainer 60 can be used to hold down the neighbouring tubes while a central tube is being lifted by the gripper.

Notes:

As mentioned above, low-temperature compartment 1 can be cooled passively, for example by using frozen carbon dioxide in the refrigerant container(s) 4. However, low temperature compartment 1 can also be cooled actively, e.g. by means of one or more heat pumps. In any case, the device advantageously comprises suitable means for keeping the temperature in compartment 1 below 0° C., in particular below −20° C., in particular below −60° C., or even lower.

In the embodiment shown, each holder apparatus 8 holds one tube rack. However, each rack holder 9, or at least one of the rack holders, can also be designed to hold more than one tube rack.

Further, the device can comprise only one holder apparatus 8, or it can hold more than two holder apparatuses. Having at least two holder apparatuses is advantageous because it allows to handle two tube racks independently, e.g. for keeping one of them at low temperatures while using the other as a shuttle as described above.

As can best be seen from FIG. 1, all drives 12, 18, 22, 33, 37, 54 of the device are located outside low-temperature compartment 1, i.e. the drives are maintained at moderate temperatures, which improves the reliability of the device.

While there are shown and described presently preferred embodiments of the invention, it is to be distinctly understood that the invention is not limited thereto but may be otherwise variously embodied and practiced within the scope of the following claims.

The invention claimed is:

1. A device for low-temperature storage and handling of probe tubes in tube racks comprising a low-temperature compartment having insulated side and bottom walls and at least one opening at a top side, a holder apparatus comprising a rack holder for holding a tube rack, a picker apparatus comprising a gripper configured to remove and insert individual tubes from or into a tube rack held by said rack holder, wherein said holder apparatus comprises a holder elevator for displacing said rack holder between an upper rack position outside said low-temperature compartment above said opening and a lower rack position inside said low-temperature compartment below said opening.

2. The device of claim 1 wherein said picker apparatus comprises a picker elevator for displacing said gripper between an upper gripper position outside said compartment above said opening and a lower gripper position inside said compartment below said opening.

3. The device of claim 1 wherein said holder apparatus is displaceable in a first horizontal direction and wherein said picker apparatus is displaceable in a second horizontal direction.

4. The device of claim 1 comprising a first and a second holder apparatus.

5. The device of claim 4 wherein said first and said second holder apparatus are mounted to a common holder frame, and wherein said holder frame is displaceable in a horizontal direction.

6. The device of the claim 5, wherein said holder apparatus is displaceable in a first horizontal direction, wherein said picker apparatus is displaceable in a second horizontal direction, wherein said holder frame is displaceable along said first horizontal direction.

7. The device of claim 5 wherein said holder frame is displaceable along a holder frame rail located outside said low-temperature compartment.

8. The device of claim 4 wherein the rack holders of said first and said second holder apparatuses are vertically moveable independently from each other.

9. The device of claim 1 wherein said holder apparatus further comprises a rack retainer located above said rack holder, the rack retainer being lowerable towards said rack holder for engaging a tube rack between said rack holder and said rack retainer.

10. The device of claim 9 wherein said holder apparatus further comprises a vertically extending holder rail, wherein both said rack holder and said rack retainer are mounted to said holder rail.

11. The device of claim 9, wherein said rack retainer comprises at least two retaining members positioned to abut from above onto corners or edges of a tube rack in said rack holder.

12. The device of claim 1 further comprising a rack handler configured to transfer a tube rack between said upper rack position and at least one further position outside said low-temperature compartment, thereby removing said tube rack from said rack holder or inserting said tube rack into said rack holder.

13. The device of claim 1 further comprising at least one refrigerant container in said low-temperature compartment for receiving frozen carbon dioxide, wherein said refrigerant container has at least one perforated sidewall.

14. The device of claim 1 wherein said gripper comprises a tip section formed by at least two tips for being inserted between gaps of neighboring probe tubes in a tube rack and for laterally engaging a probe tube to be picked up, and a shoulder section formed by at least two tip carriers immediately above said tip section, wherein said shoulder section is wider than said tip section and forms shoulders for pushing down tubes adjacent to the probe tube to be picked up.

15. The device of claim 1 further comprising a tube retainer mounted to said picker apparatus and being vertically displaceable in respect to said gripper, wherein at least a tip section of said gripper is vertically movable through said tube retainer to engage a tube below said tube retainer.

16. A method for operating the device of claim 1, wherein an environment above said opening is maintained at a temperature below 0° C. but above a temperature in said compartment and at a relative humidity of less than 20%.

17. The method of claim 16 further comprising:
using shoulders of fingers of said gripper for pushing down probe tubes neighboring to a probe tube to be picked up, or
using a tube retainer vertically displaceable in respect to said gripper for pushing down probe tubes neighboring to a probe tube to be picked up.

18. The device of claim 2 wherein said gripper in said lower gripper position is vertically located to access a tube in a tube rack held by said rack holder in said lower rack position.

19. The device of claim 3 wherein said first horizontal direction is perpendicular to said second horizontal direction.

20. The device of claim 13 wherein said refrigerant container is mounted to a sidewall of said low-temperature compartment.

21. The device of claim 11, wherein said rack retainer comprises four retaining members positioned to abut from above onto corners or edges of a tube rack in said rack holder.

22. A device for low-temperature storage and handling of probe tubes in tube racks comprising
a low-temperature compartment having insulated side and bottom walls and at least one opening at a top side,
a holder apparatus comprising a rack holder for holding a tube rack, a holder elevator for displacing said rack holder between an upper rack position, which is located outside said low-temperature compartment and above said opening and a lower rack position, which is located inside said low-temperature compartment and below said opening, wherein the tube rack is securely held in the rack holder; and
a picker apparatus comprising a gripper configured to remove and insert individual tubes from or into a tube rack while it is being securely held by said rack holder.

* * * * *